UNITED STATES PATENT OFFICE.

OSWALD LÖFFLER AND WILHELM WEIDLE, OF VIENNA, AUSTRIA-HUNGARY.

FILTERING MATERIAL.

No. 815,846.  Specification of Letters Patent.  Patented March 20, 1906.

Application filed March 28, 1905. Serial No. 252,601.

*To all whom it may concern:*

Be it known that we, OSWALD LÖFFLER, a subject of the Emperor of Austria-Hungary, and WILHELM WEIDLE, a subject of the German Emperor, manufacturers, residing at Vienna, in the province of Lower Austria and Empire of Austria-Hungary, have invented new and useful Improvements in a Filtering Material, of which the following is a specification.

The present invention relates to a filtering material consisting of asbestos, chalk, fossil-meal, and syenite, these materials in a very finely pulverized condition being mixed with water to form a mass or paste which is pressed into molds and burned.

It is not new to obtain a filtering material by molding and burning a mixture of fossil-meal and asbestos to which organic substances are sometimes added; but the material so obtained has certain disadvantages—for instance, it breaks easily by shock or impact and has not sufficient solidity. Consequently it is quickly worn by friction and is therefore too rapidly worn out by cleaning. It even dusts or crumbles when in a dry state. Moreover, capillary cracks and holes, through which the bacteria may pass into the interior of the filtering substance, cannot be absolutely prevented and permit of a rapid growing or passing through of the germs. Further, the use of syenite for the manufacture of filtering materials is also already known, finely-pulverized syenite alone moistened with water being pressed into molds and burned. The manufacture of such filtering materials is, however, very difficult, since the degree of pulverization, the strength of compression, and the temperature of burning must be in an exactly-defined proportion.

The filtering material produced according to the present invention has none of the above-mentioned disadvantages associated with the known filtering materials. By the combination and burning of asbestos, chalk, fossil-meal, and syenite a filtering material having an exceedingly fine and uniform degree of porosity is obtained, so that the bacteria cannot enter into its interior and are completely held back on the surface, whence they can be easily removed. Cracks are completely prevented, and therefore the ensuing disadvantages. Cracking does not result even when sterilizing, which usually happens with most filtering materials, whereas with the known filtering materials a quantity of bacteria, although a very small proportion thereof pass through the filtering material, a number of tests with the improved filtering material have resulted in a product absolutely free from germs. This filtering material has also an invariable hardness combined with great toughness; so that it is not affected by external influences, such as shocks, impacts, or falls.

Having now described our invention, what we claim, and desire to secure by Letters Patent of the United States, is—

A filtering material consisting of finely-pulverized asbestos, chalk, fossil-meal and syenite mixed with water, the mixture being pressed into molds and burned.

In testimony whereof we have signed our names to this specification in the presence of two subscribing witnesses.

OSWALD LÖFFLER.
WILHELM WEIDLE.

Witnesses:
HANS PAPPENHEIM,
ALVESTO S. HOGUE.